US009748573B2

(12) United States Patent
Yang et al.

(10) Patent No.: US 9,748,573 B2
(45) Date of Patent: Aug. 29, 2017

(54) MESOPOROUS SILICON COMPOUND USED AS LITHIUM-ION CELL NEGATIVE ELECTRODE MATERIAL AND PREPARATION METHOD THEREOF

(75) Inventors: Jun Yang, Shanghai (CN); Pengfei Gao, Shanghai (CN); Jingjun Zhang, Shanghai (CN); Longjie Zhou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 852 days.

(21) Appl. No.: 14/236,878

(22) PCT Filed: Aug. 3, 2012

(86) PCT No.: PCT/CN2012/079666
§ 371 (c)(1),
(2), (4) Date: May 2, 2014

(87) PCT Pub. No.: WO2013/017103
PCT Pub. Date: Feb. 7, 2013

(65) Prior Publication Data
US 2014/0234721 A1  Aug. 21, 2014

(30) Foreign Application Priority Data
Aug. 4, 2011  (CN) .......................... 2011 1 0221615

(51) Int. Cl.
*H01M 4/36* (2006.01)
*H01M 4/38* (2006.01)
(Continued)

(52) U.S. Cl.
CPC ............. *H01M 4/583* (2013.01); *C01B 33/00* (2013.01); *C01B 33/06* (2013.01); *H01M 4/364* (2013.01);
(Continued)

(58) Field of Classification Search
None
See application file for complete search history.

(56) References Cited

U.S. PATENT DOCUMENTS 6,541,156 B1 *  4/2003  Fuse ...................... H01M 4/13
252/182.1
2002/0086211 A1  7/2002  Umeno et al.
(Continued)

FOREIGN PATENT DOCUMENTS

CN  1761089 A  4/2006
CN  1913200 A  2/2007
(Continued)

OTHER PUBLICATIONS

Kim et al., Three-Dimensional Porous Silicon Particles for Use in High-Performance Lithium Secondary Batteries, Angew. Chem, Int. Ed. 47, 10151-10154, 2008, 2008 Wiley-VCH Verlag Gmbh & Co. KGaA, Weinheim.*
(Continued)

*Primary Examiner* — Rena D Cronin
(74) *Attorney, Agent, or Firm* — Maginot, Moore & Beck LLP (57) ABSTRACT

A mesoporous silicon compound includes a mesoporous silicon phase, a metal silicide phase, and a carbon phase. The metal silicide is embedded in mesoporous silicon particles, the surfaces of which are coated with a carbon layer. A weight ratio of elemental silicon to the metal element is from 2:3 to 900:1. The pores of the mesoporous silicon particles have a size distribution from two nanometers to eighty nanometers.

20 Claims, 4 Drawing Sheets

Mesoporous Silicon
 Metal Silicide
 Carbon

(51) Int. Cl.
   H01M 4/04 (2006.01)
   H01M 4/62 (2006.01)
   H01M 4/583 (2010.01)
   C01B 33/00 (2006.01)
   C01B 33/06 (2006.01)
   H01M 4/587 (2010.01)
   H01M 4/1395 (2010.01)
   H01M 10/052 (2010.01)

(52) U.S. Cl.
   CPC .......... *H01M 4/366* (2013.01); *H01M 4/386* (2013.01); *H01M 4/0428* (2013.01); *H01M 4/0471* (2013.01); *H01M 4/1395* (2013.01); *H01M 4/587* (2013.01); *H01M 4/625* (2013.01); *H01M 10/052* (2013.01)

(56) References Cited

U.S. PATENT DOCUMENTS

| | | | |
|---|---|---|---|
| 2005/0074387 A1* | 4/2005 | Bulan | C01B 33/03 423/342 |
| 2006/0105242 A1* | 5/2006 | Sato | H01M 4/13 429/231.95 |
| 2011/0121225 A1* | 5/2011 | Posudievsky | B82Y 30/00 252/182.1 |

FOREIGN PATENT DOCUMENTS

| | | |
|---|---|---|
| CN | 1937288 A | 3/2007 |
| CN | 101188281 A | 5/2008 |
| CN | 101510602 A | 8/2009 |
| CN | 101609891 A | 12/2009 |

OTHER PUBLICATIONS

Hwa et al., Facile synthesis of Si nanoparticles using magnesium silicide reduction and its carbon composite as a high-performance anode for Li ion batteries, Journal of Power Sources 252 (2014) 144-149, available online Dec. 11, 2013, Science Direct, 2013 Elsevier B.V.*

Lv et al., Electrochemical behavior of nanoporous/nanofibrous Si anode materials prepared by mechanochemical reduction, Journal of Alloys and Compounds 490 (2010) 84-87, available online Oct. 13, 2009, 2009 Elsevier B.V.*

Zheng et al. Nano-porous Si/C composites for anode material of lithium-ion batteries, Electrochimica Acta 52 (2007) 5863-5867, available online Mar. 12, 2007, ScienceDirect, 2007 Elsevier Ltd.*

Zheng et al., Nano-porous Si/C composites for anode material of lithium-ion batteries, Electrochimica Acta, 2007, pp. 5863-5867, vol. 52, Elsevier Ltd., ScienceDirect.

International Search Report corresponding to PCT Application No. PCT/CN2012/079666, mailed Oct. 4, 2012 (Chinese and English language document) (7 pages).

* cited by examiner

MESOPOROUS SILICON COMPOUND USED AS LITHIUM-ION CELL NEGATIVE ELECTRODE MATERIAL AND PREPARATION METHOD THEREOF

This application is a 35 U.S.C. §371 National Stage Application of PCT/CN2012/079666, filed on Aug. 3, 2012, which claims the benefit of priority to Serial No. CN 201110221615.3, filed on Aug. 4, 2011 in China, the disclosures of which are incorporated herein by reference in their entirety.

FIELD

The present disclosure relates to a field of battery, and specifically to a mesoporous silicon composite usable as anode materials for lithium ion battery which consists of a mesoporous silicon phase, a metal silicide phase and a carbon phase, as well as to the preparation method thereof.

BACKGROUND

Nowadays, graphite, a form of carbon, is the most important anode materials for lithium ion batteries which are commonly used in cell-phones, notebooks, digital cameras, power tools, etc. As the automotive industry turns to electric vehicles, the current lithium ion battery system and technology face many new challenges, such as low specific energy density, safety problem of battery packs, high price of unit energy of Wh, etc. The main reason why the current lithium ion batteries have a relatively low specific energy density relates to the type of the anode used in the batteries. The graphite anodes currently used have a low capacity (theoretically 372 mAh/g) for storing lithium ions, and this leads to a problem of a low overall storage capacity of the batteries. New materials, methods and technologies shall be developed for lithium ion battery before it goes into mass use in Pure EVs and Plug-in EVs.

Silicon is one of the most promising candidate anode materials for lithium ion batteries because of its highest theoretical specific capacity (4200 mAh/g) and low discharge potential. Now researchers have realized that the anode capacity can be increased by many times, if graphite is replaced by silicon composites. By far, the problem of this approach lies in that silicon is easily cracked and pulverized when it is loaded with lithium ions during the charge-discharge cycles. So the cycling ability of the battery will be very poor.

The use of Si/C composites has been investigated for many years to overcome the limitation of pure Si powder. Conventional composites, which are commonly prepared by pyrolysis, mechanical mixing and milling, or a certain combination of these two, consist of Si particles embedded into a dense carbon matrix. However, a large volume change in Si during Li insertion can be accommodated by carbon only to a limited degree, and thus, only a limited enhancement of stability and capacity can be achieved.

Porous structure is an effective approach to accommodate the volume change. Zheng, Y et al., *Electrochim. Acta*, 2007. 52(19): p. 5863-5867 discloses a nano-porous silicon composite incorporated with graphite and pyrolyzed carbon, which is prepared by a template method including two-step ball-milling followed by etching with hydrochloric acid. The initial specific charge capacity is 649 mAh/g, the initial specific discharge capacity is 1019 mAh/g, and the efficiency is 64%. Said composite shows a good cycling stability and no capacity loss after up to 120 cycles. This is attributed to the nanosized pores in Si particles. However, the reversible capacity of said composite is relatively low.

CN 1761089 A discloses a Si/C/graphite composite anode material for lithium ion battery, in which the content of elementary silicon is 10-80 wt. %, the content of graphite is 10-60 wt. %, and the rest is amorphous carbon. The initial specific charge capacity is 1115 mAh/g, the initial specific discharge capacity is 1365 mAh/g, and the efficiency is 82%. At the 10th cycle, the specific charge capacity is 784 mAh/g, the specific discharge capacity is 838 mAh/g, and the capacity retention is 70%.

SUMMARY

The present disclosure provides a mesoporous silicon composite as anode materials for lithium ion battery. Compared with the prior art, a higher reversible capacity and a more stable cycling performance can be achieved by said mesoporous silicon composite as anode materials. The present disclosure further provides a method for preparing said mesoporous silicon composite, which is much simpler and more friendly to the environment than the prior art.

According to one aspect, a mesoporous silicon composite consisting of mesoporous silicon phase, metal silicide phase and carbon phase is provided, characterized in that metal silicide is embedded into mesoporous silicon particles, and the surface of the mesoporous silicon particles is coated with a carbon layer; the weight ratio of silicon element to metal element is 2:3-900:1; the mesoporous silicon particles have a pore size distribution of 2-80 nm, preferably 3-70 nm, more preferably 3-50 nm, and particularly preferably have a pore size distribution of 3-5 nm and 20-50 nm.

In an embodiment of the mesoporous silicon composite, the weight ratio of silicon element to metal element is preferably 2:1-60:1, more preferably 8:3-12:1, and particularly preferably 5:1-6:1.

In said composite, said metal silicide can be selected from nickel silicides, cobalt silicides such as $CoSi_2$, and iron silicides.

According to another aspect, a method for preparing a mesoporous silicon composite consisting of mesoporous silicon phase, metal silicide phase and carbon phase is provided, said method including the following steps:
1) ball-milling $SiCl_4$, Li—Si alloy powder and metal powder, such as nickel powder, cobalt powder and/or iron powder;
2) washing the ball-milled product with water; and
3) coating the washed product with a carbon layer, so as to obtain said mesoporous silicon composite.

According to a further aspect, a method for preparing a mesoporous silicon composite consisting of mesoporous silicon phase, metal silicide phase and carbon phase is provided, said method including the following steps:
1) ball-milling $SiCl_4$ and Li—Si alloy powder;
2) washing the ball-milled product with water;
3) adding the washed product from 2) into a metal chloride solution, and removing the solvent before a thermal reduction in a reducing atmosphere containing hydrogen; and
4) coating the product from 3) with a carbon layer, so as to obtain said mesoporous silicon composite.

The amount of each starting material used can be determined according to the weight ratio of the elements in the mesoporous silicon composite.

In said method, said carbon layer can be formed by chemical vapor deposition (CVD) or polymer pyrolysis, preferably by polymer pyrolysis, including "in-situ polymerization and pyrolysis" and polymer solution pyrolysis, particularly preferably by polymer solution pyrolysis. Said polymer is for example polyvinyl chloride (PVC), pitch and/or polyacrylonitrile (PAN), or their combinations.

According to a further aspect, the present disclosure relates to the electrode material and battery containing said composite.

BRIEF DESCRIPTION OF DRAWINGS

Each aspect of the present disclosure will be illustrated in more detail in conjunction with the accompanying drawings, wherein.

DETAILED DESCRIPTION

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

In the present application, it is described that metal silicide, graphite or conductive carbon black and/or their combinations are embedded into the mesoporous silicon particles, wherein said embedding can be any one of the following modes or their combinations: 1) metal silicide particles are completely or partially coated by mesoporous silicon particles; 2) mesoporous silicon particles are completely or partially coated by metal silicide; 3) mesoporous silicon particles are distributed in the gap between the metal silicide particles; 4) metal silicide particles are distributed in the gap between the mesoporous silicon particles; 5) any other equivalent embedding mode, by which substantially the same or similar technical effects can be achieved.

In the present application, it is described that the surface of the mesoporous silicon particles is coated with a carbon layer, wherein said coating can be any one of the following modes or their combinations: 1) the complete or partial surface of the mesoporous silicon particles is coated by a continuous carbon layer; 2) the complete or partial surface of the mesoporous silicon particles is coated by a discontinuous carbon layer or carbon particles; 3) any other equivalent coating mode, by which substantially the same or similar technical effects can be achieved.

The present disclosure, according to one aspect, relates to a mesoporous silicon composite consisting of a mesoporous silicon phase, a metal silicide phase and a carbon phase, characterized in that metal silicide is embedded into mesoporous silicon particles, and the surface of the mesoporous silicon particles is coated with a carbon layer; the weight ratio of silicon element to metal element is 2:3-900:1; the mesoporous silicon particles have a pore size distribution of 2-80 nm, preferably 3-70 nm, more preferably 3-50 nm, and particularly preferably have a pore size distribution of 3-5 nm and 20-50 nm.

The weight ratio of silicon element to metal element is preferably 2:1-60:1, more preferably 8:3-12:1, particularly preferably 5:1-6:1. Based on the total weight of said composite, the carbon content is preferably 10-50 wt. %, more preferably 20-40 wt. %.

In said mesoporous silicon composite, said metal silicide can be selected from nickel silicides, cobalt silicides and iron silicides, preferably CoSi$_2$.

Said carbon layer can be formed by polymer pyrolysis or CVD. Said polymer can be any polymer which can form a carbon layer by pyrolysis, for example PVC, pitch and/or PAN, or their combinations.

Preferably, a certain amount of graphite or conductive carbon black as dispersant can be additionally embedded into said mesoporous silicon particles, and conductivity can be enhanced as well. Based on the total weight of said composite, the amount of graphite or conductive carbon black additionally incorporated is 2-10 wt. %, preferably 6-8 wt. %.

Said mesoporous silicon composite as anode materials for lithium ion batteries (silicon/metal silicide/carbon) consists of a mesoporous silicon phase, a metal silicide phase and a carbon phase, and shows a high reversible capacity and a stable cycling performance. This is mainly attributable to the combination of the mesoporous structure and the alloy phase. The mesopores in silicon provide a space for volume expansion, while the metal silicide alloy phase protects said composite from cracking and pulverization.

Figure 1:
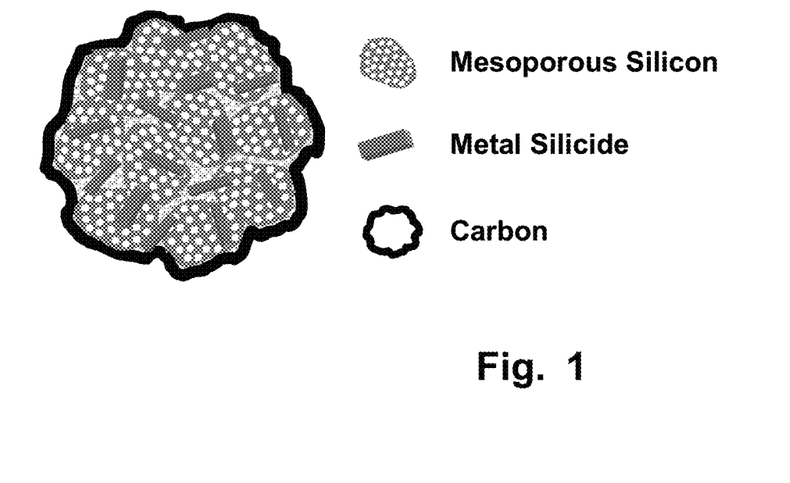
FIG. 1 shows the schematic diagram of the structure of the mesoporous silicon composite.

FIG. 1 shows the schematic diagram of the structure of said mesoporous silicon composite. Said mesoporous silicon composite consists of a mesoporous silicon phase, a metal silicide phase and a carbon phase, wherein metal silicide is embedded into the mesoporous silicon particles, and the surface of the mesoporous silicon particles is coated with a carbon layer.

The surface of the silicon particles is coated with a carbon layer, preferably by a partially graphitized carbon layer. This effectively buffers the volume effect of the silicon particles during the charge-discharge cycles, enhances the structural stability of the silicon particles during the lithium intercalation and deintercalation and the conductive property of the composite, prevents the direct contact of the silicon surface and the electrolyte to reduce the irreversible capacity loss caused by side reaction, and enhances the electronic conductivity between the silicon particles, so that the cycling stability of the overall electrode can be considerably enhanced.

The present disclosure, according to another aspect, relates to a method (1) for preparing a mesoporous silicon composite consisting of a mesoporous silicon phase, a metal silicide phase and a carbon phase, said method including the following steps:
1) ball-milling $SiCl_4$, Li—Si alloy powder and metal powder;
2) washing the ball-milled product with water; and
3) coating the washed product with a carbon layer, so as to obtain said mesoporous silicon composite.

The amount of each starting material used can be determined according to the weight ratio of the elements in the mesoporous silicon composite.

In particular, firstly $SiCl_4$, Li—Si alloy powder, and metal powder are ball-milled. The conditions in said ball-milling step are well known for a person skilled in the art. A Si/metal silicide/LiCl composite is obtained from said ball-milling step, wherein metal silicide is embedded into the silicon particles. The Li—Si alloy used here is not particularly limited, and any common Li—Si alloys, for example $Li_{13}Si_4$, can be used. The suitable metal powder used here can be selected from nickel powder, cobalt powder and iron powder, preferably cobalt powder. Accordingly, said metal silicides are nickel silicides (such as $NiSi$, $Ni_2Si$), cobalt silicides (such as $CoSi_2$) and iron silicides (such as $FeSi_2$).

The ball-milled product is optionally subjected to a heat treatment, to carry out the reaction of the above starting materials sufficiently and obtain an alloy phase having a suitable grain size. The conditions in said heat treatment are well known for a person skilled in the art, for example heating at a rate of 5° C.·min$^{-1}$ to 500-1000° C., preferably 700-1000° C., particularly preferably to about 900° C., and holding at this temperature for 1-6 hours, preferably 1-3 hours, particularly preferably about 2 hours, and then naturally cooling to room temperature.

Subsequently, LiCl is removed by washing with water, preferably deionized water, so as to form a mesoporous silicon/metal silicide composite. Here, the mesoporous silicon/metal silicide composite particles have a pore size distribution of 2-80 nm. Finally, the mesoporous silicon/metal silicide composite as prepared above is coated with a carbon layer. Said carbon layer can be formed by chemical vapor deposition (CVD) or polymer pyrolysis, preferably by polymer pyrolysis, including "in-situ polymerization and pyrolysis" and polymer solution pyrolysis, particularly preferably by polymer solution pyrolysis.

Based on 100 parts by weight of the mesoporous silicon/metal silicide composite, said polymer can be used in an amount of 11-66 parts by weight, preferably 33-50 parts by weight.

Polymer-soluble volatile solvents commonly used in the relevant technical field, such as tetrahydrofuran (THF), acetone, dimethyl formamide (DMF), ethanol, etc. can be used as the solvent in said polymer solution. The concentration of said polymer solution is also well known for a person skilled in the art.

The conditions used in CVD are well known for a person skilled in the art, for example using toluene as the starting material, using argon as the carrier, treating at 700-900° C., preferably at about 800° C. for 1-2 hours, preferably about 1.5 hours, so as to obtain a coating of carbon layer.

In particular, the ball-milled and water-washed product is dispersed in a polymer solution to form a dispersion, which is then pyrolyzed to obtain a mesoporous silicon composite.

Said polymer can be any polymer which can form a carbon layer by pyrolysis, for example PVC, pitch and/or PAN, or their combinations. The conditions in said pyrolysis are well known for a person skilled in the art, for example heating at a rate of 5° C.·min$^{-1}$ to 700-1000° C., preferably 800-1000° C., particularly preferably to about 900° C., and holding at this temperature for 1-6 hours, preferably 1-3 hours, particularly preferably about 2 hours.

The present disclosure, according to a further aspect, relates to a method (2) for preparing a mesoporous silicon composite consisting of a mesoporous silicon phase, a metal silicide phase and a carbon phase, said method including the following steps:
1) ball-milling $SiCl_4$ and Li—Si alloy powder;
2) washing the ball-milled product with water;
3) adding the washed product from 2) into a metal chloride solution, and removing the solvent before a thermal reduction in a reducing atmosphere containing hydrogen; and
4) coating the product from 3) with a carbon layer, so as to obtain said mesoporous silicon composite.

The amount of each starting material used can be determined according to the weight ratio of the elements in the mesoporous silicon composite.

In particular, firstly $SiCl_4$ and Li—Si alloy powder are ball-milled. The conditions in said ball-milling step are well known for a person skilled in the art. A Si/LiCl composite is obtained from said ball-milling step. The Li—Si alloy used here is not particularly limited, and any common Li—Si alloys, for example $Li_{13}Si_4$, can be used.

The ball-milled product is optionally subjected to a heat treatment, to carry out the reaction of the above starting materials sufficiently and obtain an alloy phase having a suitable grain size. The conditions in said heat treatment are well known for a person skilled in the art, for example heating at a rate of 5° C.·min$^{-1}$ to 500-1000° C., preferably 700-1000° C., particularly preferably to about 900° C., and holding at this temperature for 1-6 hours, preferably 1-3 hours, particularly preferably about 2 hours, and then naturally cooling to room temperature.

Subsequently, LiCl is removed by washing with water, preferably deionized water, so as to form mesoporous silicon. Here, the mesoporous silicon particles have a pore size distribution of 2-80 nm.

Then, the mesoporous silicon particles as prepared above are added into a metal chloride solution, and stirred homogeneously before the solvent is removed by vacuum drying. The suitable metal chloride used here is selected from nickel chlorides, cobalt chlorides and iron chlorides, or their hydrates, preferably cobalt chlorides or their hydrates. Here, metal chloride-soluble volatile solvents commonly used in the relevant technical field, such as tetrahydrofuran (THF), acetone, dimethyl formamide (DMF), ethanol, etc. can be used as the solvent in said metal chloride solution. The concentration of said metal chloride solution is also well known for a person skilled in the art.

Then, a thermal reduction is carried out in a reducing atmosphere containing hydrogen, so as to obtain a mesoporous silicon/metal silicide composite ($Si/MSi_x$). Here, said reducing atmosphere can contain inert gas, for example argon. The hydrogen content in said reducing atmosphere is not particularly limited and is well known for a person skilled in the art, for example 5 vol. %. The other conditions in said thermal reduction are well known for a person skilled in the art, for example subjecting to a heat treatment firstly at a lower temperature of 300-500° C., preferably at about 400° C. for 1-3 hours, preferably about 2 hours, and subsequently at a higher temperature of 800-1000° C., preferably at about 900° C. for 0.5-2 hours, preferably about 1 hour, and then naturally cooling to room temperature.

Finally, the mesoporous silicon/metal silicide composite as prepared above is coated with a carbon layer in the same way as method (1).

As shown in FIG. 1, the mesoporous silicon composite prepared by said preparation method consists of a mesoporous silicon phase, a metal silicide phase and a carbon phase, wherein metal silicide is embedded into the mesoporous silicon particles, and the surface of the mesoporous silicon particles is coated with a carbon layer.

In an embodiment according to the present disclosure, graphite or conductive carbon black can be additionally embedded into said mesoporous silicon composite to enhance conductivity. In this case, $SiCl_4$, Li—Si alloy powder, metal powder together with graphite or conductive carbon black are ball-milled in step 1). Based on 100 parts by weight of the mesoporous silicon composite, graphite or conductive carbon black can be used in an amount of 0.1-9 parts by weight, preferably 2-5 parts by weight.

In order to form porous silicon, expensive acids which are not friendly to the environment are used in the template method according to the prior art, while on the contrary, a mesoporous silicon phase can be formed only by water-washing in the method according to one aspect of the present disclosure. So one advantage of said method lies in that said synthesis method for the composite is novel and much simpler, compared with the method according to the prior art for preparing a porous silicon composite.

Said mesoporous silicon composite can be used as anode materials for lithium ion batteries, while as cathode materials, for example lithium iron phosphate ($LiFePO_4$), lithium manganese oxide ($LiMn_2O_4$) or doped lithium manganese oxide, lithium manganese cobalt nickel oxide ($LiNi_{1/3}Mn_{1/3}Co_{1/3}O_2$) or their mixed cathode materials can be used.

The embodiments of the present disclosure will be explained below in more detail in reference to the Examples, but it should be understood that these Examples are only intended to illustrate the present disclosure, and are not to be construed as any limitation to the protection scopes thereof.

Example 1

2 ml of $SiCl_4$ (Aladdin-reagent Inc., China, purity: 99.9%), 0.84 g of $Li_{13}Si_4$ powder (SIMIT, CAS, China), 0.15 g of cobalt powder (200 mesh, Sinopharm Chemical Reagent Ltd.) and 0.10 g of Super P carbon black (40 nm, Timical) together with 15 agate balls having a diameter of 10 mm were charged into a 80 ml argon-filled agate vial, and ball-milled at a rate of 450 rpm on Planetary Mono Mill P-6 (Fritsch, Germany) for 20 hours. Then, in an argon-filled glove box, the product just mixed (main components: Si/$CoSi_2$/LiCl) was placed into a quartz tube, heated in a constant argon flow at a rate of 5° C.·min$^{-1}$, held at 900° C. for 2 hours, and then naturally cooled to room temperature. After the heat treatment, the product (main components: Si/$CoSi_2$/LiCl) was washed with deionized water, centrifuged 4 times to remove LiCl completely, and then dried at 100° C. in vacuum for 4 hours to obtain a mesoporous silicon/metal silicide composite (Si/$CoSi_2$). 1.1 g of the mesoporous silicon/metal silicide composite obtained (Si/$CoSi_2$) was added into a solution (0.2 g/ml, in 10 ml of tetrahydrofuran) of 2.1 g of polyvinyl chloride (PVC, on average Mw~233,000, Aldrich), and mixed homogeneously under ultrasonication. After stirred for 1 hour, the slurry obtained was pasted on a flat surface, dried at 80° C., heated in an argon atmosphere at a rate of 5° C.·min$^{-1}$ to 900° C., and held for 2 hours. A powdered mesoporous silicon composite (Si/$CoSi_2$/C) was finally prepared.

Figure 2:
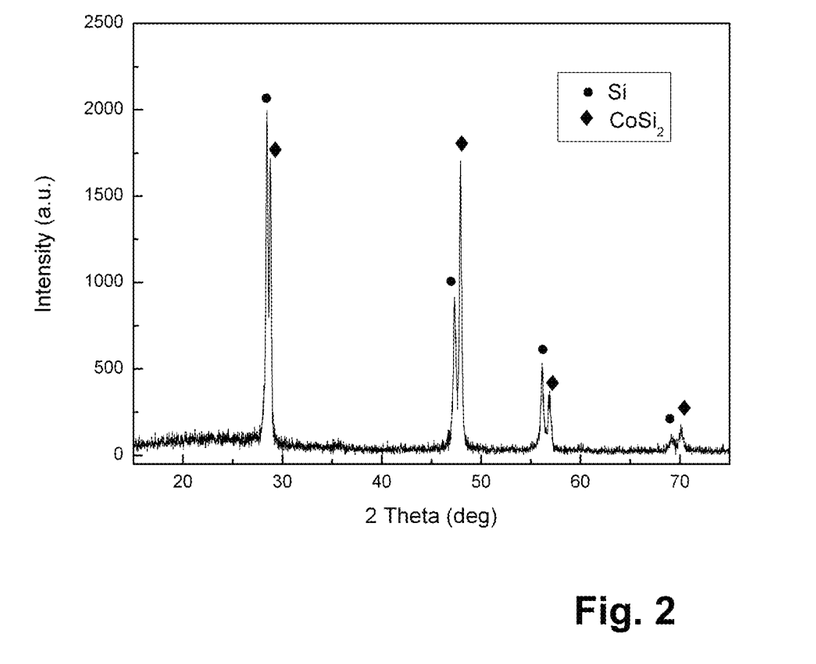
FIG. 2 shows the X-ray diffraction pattern of the mesoporous silicon composite (Si/CoSi$_2$/C)

FIG. 2 shows the X-ray diffraction pattern of the mesoporous silicon composite obtained (Si/$CoSi_2$/C). As shown in FIG. 2, the intensity of the diffraction peaks of Si and $CoSi_2$ crystal phases was very high, and there were no prominent impure peaks. Especially, it demonstrated that the purity of the $CoSi_2$ phase formed was very high, LiCl formed was removed completely, and substantially no byproduct was present.

Figure 3A:
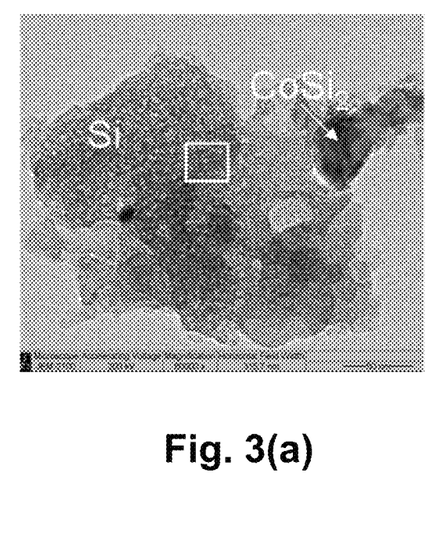
FIG. 3(a) shows a transmission electron microscope (TEM) image of the mesoporous silicon composite (Si/CoSi$_2$/C) and FIG. 3(b) shows a partially enlarged TEM image of the mesoporous silicon phase.
Figure 3B:
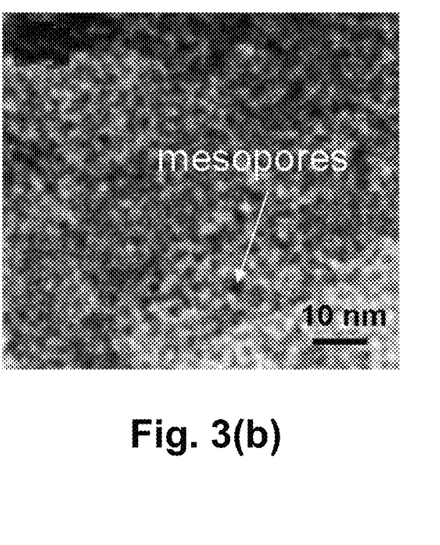

FIG. 3(a) shows a TEM image of the mesoporous silicon composite obtained (Si/$CoSi_2$/C), and FIG. 3(b) shows a partially enlarged TEM image of the mesoporous silicon phase. A carbon layer coated on the surface of the silicon particles can also be clearly seen from FIG. 3(a).

Figure 4:
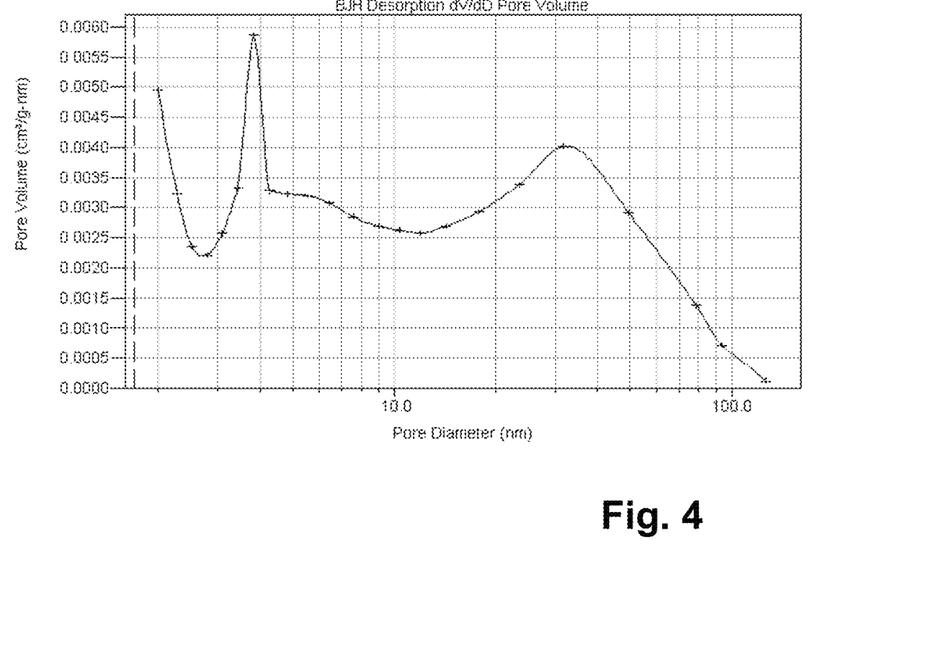
FIG. 4 shows the pore size distribution of the mesoporous silicon/metal silicide composite (Si/CoSi$_2$) obtained by the BJH method.

The pore size distribution of the mesoporous silicon obtained was measured by ASAP 2010 M+C Surface Area and Porosimetry System from Micromeritics Inc., USA. The result was shown in FIG. 4. The mesoporous silicon particles had a pore size in a range of about 3-50 nm.

Then the charge-discharge curves and the cycling performance of the mesoporous silicon composite obtained (Si/$CoSi_2$/C) were measured by the method commonly used in the prior art.

Battery Assembling and Performance Measurement

Figure 5:
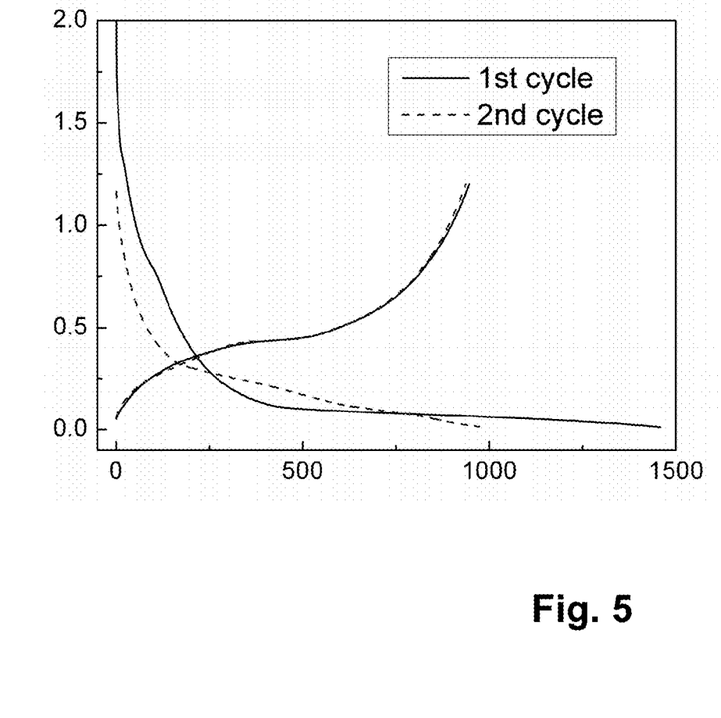
FIG. 5 shows the charge-discharge curves of an electrode of the mesoporous silicon composite (Si/CoSi$_2$/C)
Figure 6:
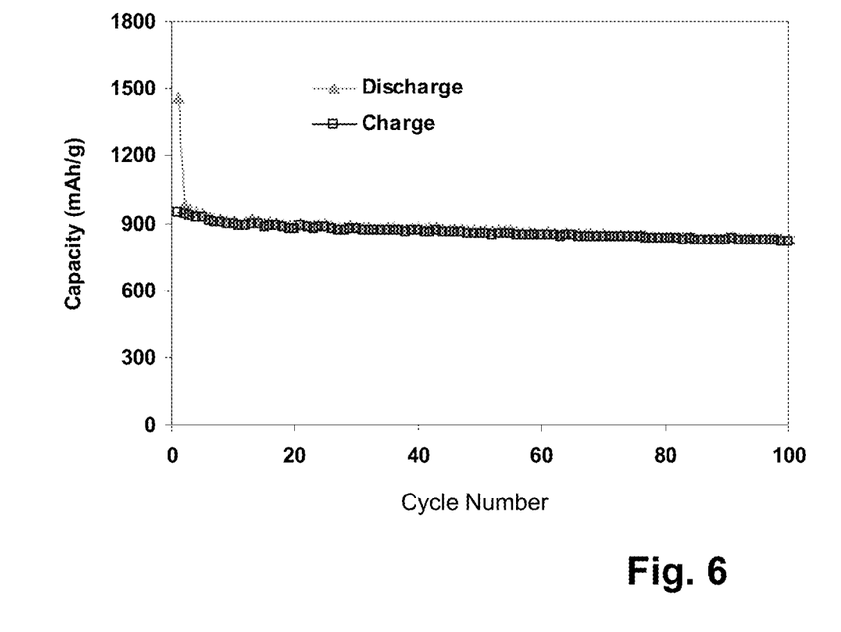
FIG. 6 shows the cycling performance curves of an electrode of the mesoporous silicon composite (Si/CoSi$_2$/C)

The mesoporous silicon composite obtained (Si/$CoSi_2$/C) and 20 wt. % of binder (an emulsion of styrene-butadiene rubber and sodium carboxymethyl cellulose, solid content: 2 wt. %) and 20 wt. % of conductive carbon black (Super P) were mixed, stirred homogeneously, pasted on a copper foil, and dried in an oven at 70° C. It was punched by a 12 mm punch pin to form an electrode slice, dried in a vacuum oven at 70° C. for 8 hours, and then transferred to an argon-filled glove box. Lithium foil was used as the counter electrode. ENTEK PE porous membrane was used as the separator. 1 mol·L$^{-1}$ mixed solution of lithium hexafluorophosphate in ethylene carbonate and dimethyl carbonate (1:1) was used as the electrolyte. A CR2016 coin cell was assembled. Galvanostatic charge-discharge test was carried out by using LAND battery testing system (Wuhan Kingnuo Electronic Co., Ltd.), and charge-discharge cut-off voltage (vs. Li/Li$^+$) was 0.01-1.2 V. FIG. 5 shows the charge-discharge curves obtained, and FIG. 6 shows the cycling performance, which is summarized in Table 1.

TABLE 1

| | Cycling Performance | | | |
|---|---|---|---|---|
| Cycle Number | Specific Charge Capacity mAh/g | Specific Discharge Capacity mAh/g | Efficiency % | Capacity Retention % |
| 1 | 945.5 | 1457.6 | 64.9 | |
| 50 | 855.5 | 870.1 | 98.3 | 90.50% |
| 100 | 819.7 | 828.3 | 99.0 | 86.70% |

Example 2 (Coating a Carbon Layer by CVD)

2 ml of $SiCl_4$ (Aladdin-reagent Inc., China, purity: 99.9%), 0.84 g of $Li_{13}Si_4$ powder (SIMIT, CAS, China), 0.15 g of cobalt powder (200 mesh, Sinopharm Chemical Reagent Ltd.) and 0.10 g of Super P carbon black (40 nm, Timical) together with 15 agate balls having a diameter of 10 mm were charged into a 80 ml argon-filled agate vial, and ball-milled at a rate of 450 rpm on Planetary Mono Mill P-6 (Fritsch, Germany) for 20 hours. Then, in an argon-filled glove box, the product just mixed (main components: Si/CoSi$_2$/LiCl) was placed into a quartz tube, heated in a constant argon flow at a rate of 5° C.·min$^{-1}$, held at 900° C. for 2 hours, and then naturally cooled to room temperature. After the heat treatment, the product (main components: Si/CoSi$_2$/LiCl) was washed with deionized water, centrifuged 4 times to remove LiCl completely, and then dried at 100° C. in vacuum for 4 hours to obtain a mesoporous silicon/metal silicide composite (Si/CoSi$_2$). The mesoporous silicon/metal silicide composite obtained (Si/CoSi$_2$) was placed into a quartz tube, into which toluene carried by argon was introduced, heated to 800° C. for a heat treatment for 1.5 hours to obtain a mesoporous silicon composite (Si/CoSi$_2$/C). The mesoporous silicon particles had a pore size in a range of about 3-50 nm.

Battery assembling and performance measurement were carried out in the same way as Example 1. The mesoporous silicon composite obtained (Si/CoSi$_2$/C) showed an initial discharge capacity of 1313.0 mAh/g, an initial charge capacity of 812.3 mAh/g, and an initial coulombic efficiency of 61.9%. After 100 charge-discharge cycles, the discharge capacity was 767.0 mAh/g, and the charge capacity was 759.4 mAh/g.

Example 3 (Cobalt Chloride as the Cobalt Source)

2 ml of SiCl$_4$ (Aladdin-reagent Inc., China, purity: 99.9%), 0.84 g of Li$_{13}$Si$_4$ powder (SIMIT, CAS, China) and 0.10 g of Super P carbon black (40 nm, Timical) together with 15 agate balls having a diameter of 10 mm were charged into a 80 ml argon-filled agate vial, and ball-milled at a rate of 450 rpm on Planetary Mono Mill P-6 (Fritsch, Germany) for 20 hours. Then, in an argon-filled glove box, the product just mixed (main components: Si/LiCl) was placed into a quartz tube, heated in a constant argon flow at a rate of 5° C.·min$^{-1}$, held at 900° C. for 2 hours, and then naturally cooled to room temperature. After the heat treatment, the product was washed with deionized water, centrifuged 4 times to remove LiCl completely, and then dried at 100° C. in vacuum for 4 hours to obtain porous silicon. 0.80 g of cobalt chloride (CoCl$_2$.6H$_2$O) was dissolved in 10 ml of ethanol, into which 1.34 g of porous silicon was also added, stirred homogeneously, dried at 60° C. in vacuum for 4 hours. After the solvent was volatilized out, it was transferred to a corundum boat in H$_2$/Ar mixed gases (H$_2$: 5 vol. %), subjected to a heat treatment firstly at 400° C. for 2 hours, then heated to 900° C. for a heat treatment for 1 hour, and naturally cooled to room temperature to obtain a mesoporous silicon/metal silicide composite (Si/CoSi$_x$). The mesoporous silicon/metal silicide composite obtained (Si/CoSi$_x$) was placed into a quartz tube, into which toluene carried by argon was introduced, heated to 800° C. for a heat treatment for 1.5 hours to obtain a mesoporous silicon composite. The mesoporous silicon particles had a pore size in a range of about 3-70 nm.

Figure 7:
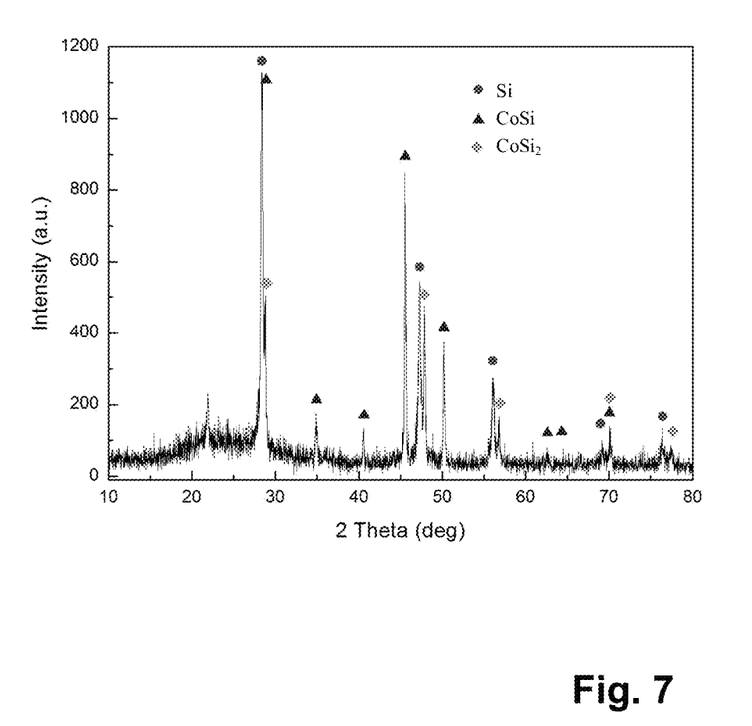
FIG. 7 shows the X-ray diffraction pattern of the mesoporous silicon composite (Si/CoSi$_2$/C) according to an embodiment.

FIG. 7 shows the X-ray diffraction pattern of the mesoporous silicon composite obtained (Si/CoSi$_x$/C). As shown in FIG. 7, the intensity of the diffraction peaks of Si and CoSi$_x$ crystal phases was very high, and there were no prominent impure peaks. Especially, it demonstrated that the purity of the CoSi$_x$ phase formed was very high, LiCl formed was removed completely, and substantially no byproduct was present.

Battery assembling and performance measurement were carried out in the same way as Example 1. The prepared mesoporous silicon composite showed an initial discharge capacity of 1595.4 mAh/g, an initial charge capacity of 931.9 mAh/g, and an initial coulombic efficiency of 58.4%. After 50 charge-discharge cycles, the discharge capacity was 1076.7 mAh/g, and the charge capacity was 1047.6 mAh/g.

It can be seen that the mesoporous silicon composite obtained according to the present disclosure showed a considerably higher reversible capacity than 649 mAh/g as obtained according to Zheng, Y et al., *Electrochim. Acta*, 2007. 52(19): p. 5863-5867. In addition, said mesoporous silicon composite therefore showed a more stable cycling performance, while the composite anode material according to CN 1761089 A only showed a capacity retention of 70% at the 10th cycle.

The embodiments described above are only intended to illustrate the concept of the present disclosure, and should not be construed as any limitation to the scopes thereof. On the contrary, it should be clearly understood that after reading the present description, an ordinary person skilled in the art is able to carry out the other technical solutions or make modifications without departing from the spirit of the present disclosure.

The invention claimed is:

1. A mesoporous silicon composite comprising:
   a mesoporous silicon phase;
   a metal silicide phase; and
   a carbon phase,
   wherein metal silicide of the metal silicide phase is embedded into mesoporous silicon particles of the mesoporous silicon phase,
   wherein a surface of the mesoporous silicon particles is coated with a carbon layer,
   wherein a weight ratio of silicon element of the mesoporous silicon phase to metal element of the metal silicide phase is 2:3 to 900:1, and
   wherein the mesoporous silicon particles define a plurality of pores having a pore size distribution of 2 nm to 80 nm.

2. The composite of claim 1, wherein the weight ratio of the silicon element to the metal element is 2:1 to 60:1.

3. The composite of claim 1, wherein the weight ratio of the silicon element to the metal element is 8:3 to 12:1.

4. The composite of claim 1, wherein said metal silicide phase includes CoSi$_2$.

5. The composite of claim 1, wherein the pores of the plurality of pores define a pore size distribution of 2 nm to 50 nm.

6. The composite of claim 1, wherein said carbon layer is formed by polymer pyrolysis.

7. The composite of claim 6, wherein said polymer is selected from PVC, pitch and PAN, or their combinations.

8. The composite of claim 1, wherein said carbon layer is formed by CVD.

9. The composite of claim 1, wherein graphite or conductive carbon black is also embedded into said mesoporous silicon particles.

10. A method for preparing a mesoporous silicon composite including a mesoporous silicon phase, a metal silicide phase, and a carbon phase, comprising:
    ball-milling SiCl$_4$, Li—Si alloy powder and metal powder;
    washing the ball-milled product with water; and
    coating the washed product with a carbon layer, so as to obtain said mesoporous silicon composite,
    wherein metal silicide of the metal silicide phase is embedded into mesoporous silicon particles of the mesoporous silicon phase, wherein a surface of the mesoporous silicon particles is coated with a carbon layer, wherein a weight ratio of silicon element of the mesoporous silicon phase to metal element of the metal silicide phase is 2:3 to 900:1, and wherein the mesoporous silicon particles define a plurality of pores having a pore size distribution of 2 nm to 80 nm.

11. The method of claim 10, wherein said metal powder includes cobalt powder.

12. A method for preparing a mesoporous silicon composite including a mesoporous silicon phase, a metal silicide phase, and a carbon phase, comprising:
1) ball-milling $SiCl_4$ and Li—Si alloy powder;
2) washing the ball-milled product with water;
3) adding the washed product from 2) into a metal chloride solution, and removing the solvent followed by a thermal reduction in a reducing atmosphere containing hydrogen; and
4) coating the product from 3) with a carbon layer, so as to obtain said mesoporous silicon composite, wherein metal silicide of the metal silicide phase is embedded into mesoporous silicon particles of the mesoporous silicon phase, wherein a surface of the mesoporous silicon particles is coated with the carbon layer, wherein a weight ratio of silicon element of the mesoporous silicon phase to metal element of the metal silicide phase is 2:3 to 900:1, and wherein the mesoporous silicon particles have a pore size distribution of 2 nm to 80 nm.

13. The method of claim 12, wherein said metal chloride includes cobalt chlorides or their hydrates.

14. The method of claim 12, wherein based on a total weight of the starting materials, graphite or conductive carbon black is additionally incorporated in 1) and ball-milled together.

15. The method of claim 12, further comprising:
after ball-milled in 1), subjecting the ball-milled product to a heat treatment.

16. The method of claim 12, wherein said coating with a carbon layer is carried out by adding the ball-milled and washed product into a polymer solution and then by pyrolysis.

17. The method of claim 16, wherein said polymer is selected from PVC, pitch and PAN, or their combinations.

18. The method of claim 12, wherein said coating with a carbon layer is carried out by CVD.

19. The method of claim 12, wherein the mesoporous silicon composite is included in an electrode material.

20. The method of claim 12, wherein the mesoporous silicon composite is included in a battery.

* * * * *